United States Patent [19]
Hildebrand

[11] 3,754,628
[45] Aug. 28, 1973

[54] LOCK STRAP MOUNTING ADJUSTMENT FOR CLUTCH ADJUSTING RING

[75] Inventor: William Gene Hildebrand, Fort Wayne, Ind.

[73] Assignee: Dana Corporation, Toledo, Ohio

[22] Filed: June 22, 1972

[21] Appl. No.: 265,408

[52] U.S. Cl. ............................... 192/111 B, 151/28
[51] Int. Cl. ............................................. F16d 13/75
[58] Field of Search ..................... 192/111 B, 70.25; 151/5, 28

[56] References Cited
UNITED STATES PATENTS

| | | | |
|---|---|---|---|
| 872,752 | 12/1907 | Rulli et al. | 151/28 |
| 1,969,149 | 8/1934 | Pearmain | 192/70.25 |
| 2,070,813 | 2/1937 | Stearn et al. | 192/111 B |
| 3,176,814 | 4/1965 | Sink | 192/111 B |

Primary Examiner—Benjamin W. Wyche
Attorney—Walter E. Pavlick, Harold D. Shall and John F. Teigland

[57] ABSTRACT

An improved arrangement is provided for mounting an adjusting ring lock strap with respect to a clutch cover to preclude premature failure of the lock strap after it has been properly secured to the cover by means of a threaded bolt. The improvement consists of a mounting slot formed in the clutch cover having tapered side walls engageable with the inner edges of the lock strap so that, in response to application of torque to the bolt, the lock strap reacts on the tapered side walls in such a manner as to provide positive frictional engagement which will prevent backing-out of the bolt.

8 Claims, 5 Drawing Figures

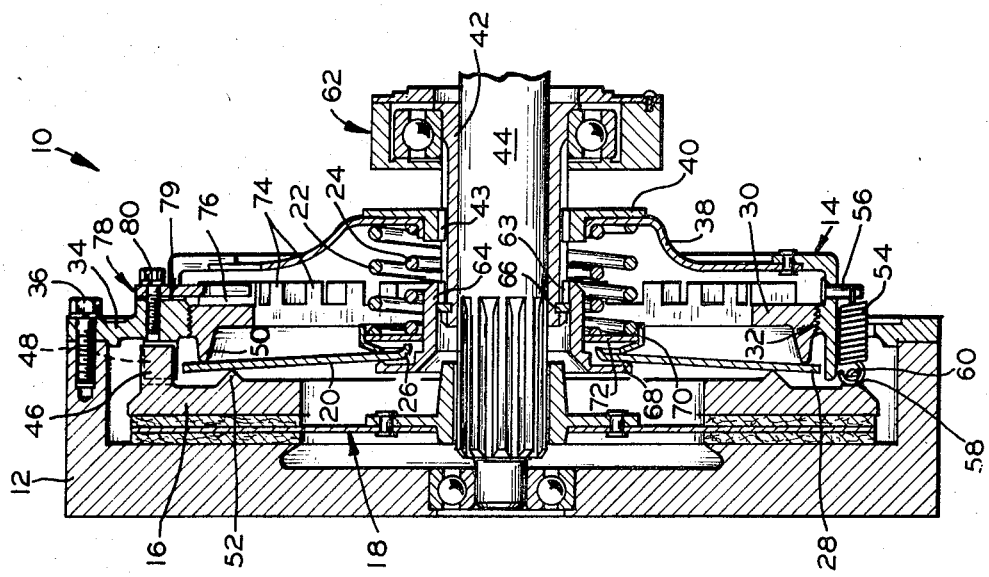
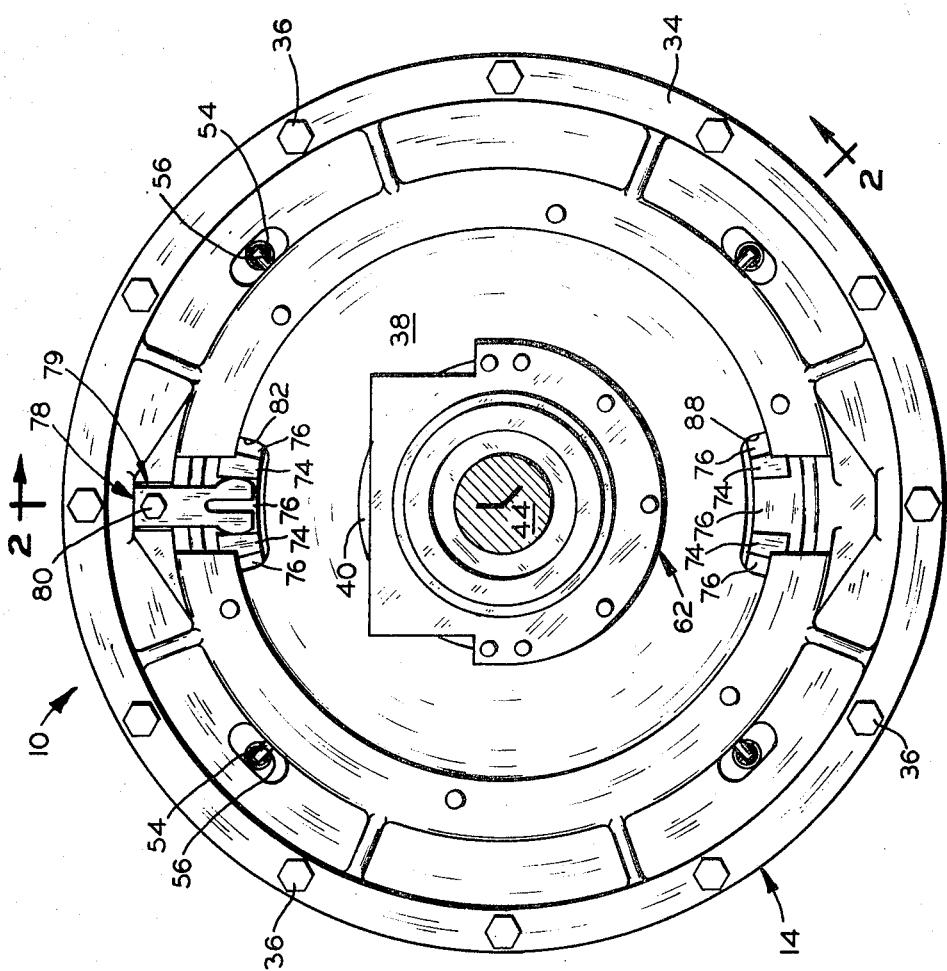

Patented Aug. 28, 1973

LOCK STRAP MOUNTING ADJUSTMENT FOR CLUTCH ADJUSTING RING

CROSS-REFERENCE TO RELATED APPLICATION

The present invention is concerned with an improvement in a clutch device of the type shown in U.S. Pat. No. 3,176,814 to W. H. Sink, entitled "Resilient Lock for Clutch Adjusting Device."

BACKGROUND OF THE INVENTION

1. Field of the Invention feature U. S.

This invention relates generally to friction clutches having an adjusting ring and more specifically to locking means for securing the adjustment of the adjusting ring in such a clutch.

2. Description of the Prior Art

Locking means for securely holding an adjusting ring of a friction clutch in its adjusted position are well known. Prior arrangements for accomplishing this feature are shown in U.S. Pat. Nos. 1,489,423, 1,644,548, 1,983,855 and 3,176,814. The present invention is directly concerned with the type of structure shown in the latter patent wherein a locking means has its outer end securely bolted within a slot provided in the clutch cover and has its radially inner end engageable with the adjusting ring to maintain the same in its adjusted position. While this structure has proved satisfactory, with the straight-sided walls employed in this slot design, a problem exists due to occasionally combined manufacturing tolerances occurring between the slot side walls and the locking means. From this clearance, the resulting back and forth movement of the locking means and the constant operation and normal vibrations present in the clutch tends to cause the bolt which is used to secure the locking means to the cover, to back out and result in premature failure of the locking means and consequently loss of adjustment and damage to the adjusting ring.

SUMMARY OF THE INVENTION

The clutch of the present invention overcomes the above problems by providing an improved slot construction on the back face of a clutch cover for cooperating with the locking means. The locking means is in the form of a radially extending lock strap adapted to be fastened to the back of the cover by means of a bolt and engages between suitable axial projections on an adjusting ring so as to resist circumferential movement of the adjusting ring relative to the cover and thus secure adjustment of the clutch. In the present invention the slot has tapered side walls for engagement with the inner bottom edges of the lock strap so that when the bolt is fastened in place, the outer edges of the strap cooperate with the walls to provide a positive frictional lock by causing the sides of the lock strap to bow and engage the tapered side walls in a manner to prevent the bolt from inadvertently backing out of engagement with the cover.

Accordingly, an object of this invention is to provide an improved mounting arrangement which results in positive retention of the bolt used to fasten the lock strap to the clutch cover.

Another object of this invention is to provide a mounting slot for a locking means of this type wherein close tolerances are not required.

Further and other objects of this invention will become apparent upon a consideration of the following specification when taken in conjunction with the drawings.

BRIEF DESCRIPTION OF THE DRAWINGS

FIG. 1 is a rear elevational view of a clutch embodying this invention;

FIG. 2 is a sectional view taken along the line of 2—2 of FIG. 1;

DESCRIPTION OF THE PREFERRED EMBODIMENT

Figure 3:
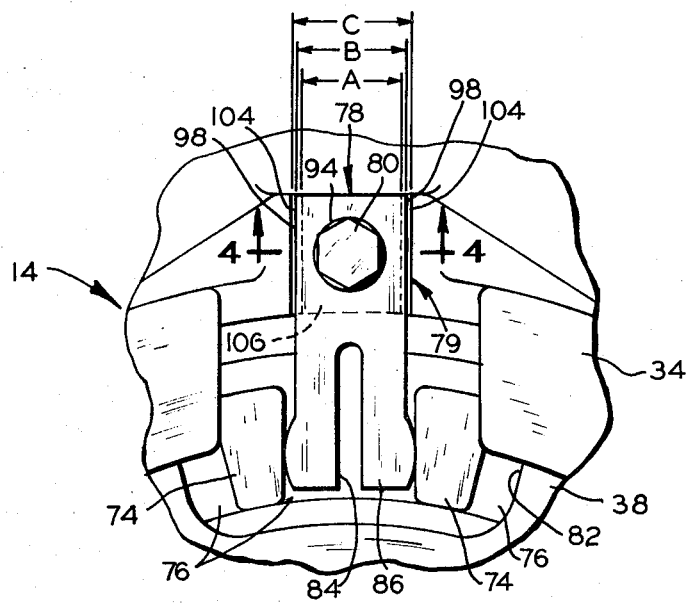
FIG. 3 is an enlarged partial rear elevational view of a portion of the clutch shown in FIG. 1 to more clearly show the details of the invention.

Briefly, with reference to FIGS. 1 and 2, in the preferred form of this invention a spring loaded friction clutch is shown generally at 10 having a driving member in the form of a flywheel 12. Drivingly connected to the flywheel 12 for unitary rotation is a cover member 14 and a pressure plate 16. The pressure plate 16 is normally biased toward a driven member in the form of a friction disc 18. To normally bias the pressure plate 16 toward the friction disc 18, engaging means, consisting of a plurality of radially extending levers 20, are disposed intermediate the pressure plate 16 and the cover member 14. A pair of centrally located concentric coiled compression springs 22-24 engage the inner ends 26 of the levers 20 with the outer ends 28 of the levers engaging an adjusting ring 30 which is threadedly carried at 32 within the cover member 14. The levers 20 engage the pressure plate 16 between their inner and outer ends 26-28 and the threaded connection 32, between the adjusting ring 30 and the cover member 14, permits circumferential rotation of the adjusting ring 30 relative to the cover member 14 to effect adjustment of the throw of the levers 20.

More particularly, as seen in FIG. 2, the clutch cover 14 is of a three piece construction having an outer annular portion 34 secured to the flywheel 12 by means of a plurality of bolts 36, an intermediate annular portion 38 enclosing the operating parts of the clutch and an inner portion 40 which is disposed about a hollow release sleeve 42. The various portions 34, 36 and 38 of the cover 14 are secured together in a well known manner as by means of a plurality of rivets.

An output shaft, shown fragmentarily at 44, is adapted to be clutched into a driving relationship with the flywheel 12. The forward end of output shaft 44 is piloted in the flywheel 12 and extends axially rearwardly therefrom and is splined to the inner portion 40 of the cover 14. The friction disc 18 is splined for unitary rotation and relative axial movement on the forward end of the shaft 44 and is adapted to be pressed into a driving relationship with the flywheel 12 by the axially movable pressure plate 16. The pressure plate 16 is drivingly connected to the cover member 14 by means of a plurality of drive lugs 46 extending axially from the rear surface thereof into registering slots 48 formed in the outer annular flange portion 34 of the cover 14.

ADJUSTING RING

The adjusting ring 30 is peripherally connected to the inerior of the outer flange portion 34 of the cover 14 by the threaded connection shown generally at 32 so that circumferential movement of the ring 30 relative to the cover member 14 results in axial movement of the ring relative to the cover member and other portions of the clutch 10. An annular shoulder 50 extends axially forward from the adjusting ring 30 adjacent the periphery thereof for engagement with the outer ends 28 of the levers 20. Radially inwardly from shoulder 50, the levers 20 pivotally engage an annualr shoulder 52 formed on the rear face of the pressure plate 16 which is co-axially arranged with respect to the shoulder 50. In this manner, forward movement of the inner ends 26 of the levers 20 causes the lever 20 to pivot on the shoulder 50 and press the levers on the shoulder 52 thereby urging the pressure plate 16 forwardly to press the friction disc 18 into engagement with the flywheel 12. Rearward movement of the levers 20 allows a plurality of return springs 54 to bias the pressure plate 12 rearwardly away from the friction disc 18. One end of each of the return springs 54 is suitably secured to one of a plurality of shouldered pins 56 pressed through the intermediate portion 38 of cover 14 and extending radially therefrom. The other end of each of the return springs 54 engages an opening 58 formed in one of a plurality of bosses 60 extending axially from the rear face of the pressure plate 16.

OPERATING MEANS

Means is provided to urge the inner ends 26 of the levers 20 axially. More particularly, this means consists of the hollow release sleeve 42 and a throw-out bearing 62. The release sleeve 42 is rotatably mounted on the output shaft 44 for axial movement relative thereto while the throw-out bearing 62 is secured to the sleeve 42 and is energized by a suitable linkage (not shown) to induce axial movement to the sleeve 42 in a well known manner. Further, the release sleeve 42 is splined at 43 for axial movement in the central opening of the inner portion 40 of the cover 14 and has splined to its forward end at 63 a flanged lever retaining sleeve 64 which is secured against axial movement relative thereto by an annular snap ring 66. The inner ends 26 of the levers 20 are disposed between a radial flanged portion 68 of the sleeve 64 and an annular lever fulcrum ring 70 surrounding the sleeve 64. An annular spring retaining ring 72 surrounds the sleeve 64 and abuts the fulcrum ring 70 and is pressed against the same by the coiled compression springs 22 and 24 compressed between the cover member 14 and the spring retaining ring 72. As stated earlier, the springs 22 and 24 urge the inner ends 26 of the levers 20 forwardly thereby biasing the pressure plate 16 toward the flywheel 12. Rearward movement of the release sleeve 42 pulls the inner ends 26 of the levers 20 rearwardly against the bias of the springs 22 and 24, allowing the pressure plate 16 to be moved away from the flywheel 12 by the return springs 54.

The threaded engagement 32 between the adjusting ring 30 and the cover 14 is such that upon rotation of the adjusting ring 30 relative to the cover member 14, the shoulder 50, upon which the outer ends 28 of levers 20 pivot, may be moved axially inwardly relative to the cover member 14 and the other components of the clutch, thereby adjusting the throw of the levers 20 so that wear and loss of spring biasing effect may be compensated for.

LOCKING MEANS

Locking means is provided to secure the position of the adjusting ring 30 relative to the clutch cover 14. To this end, the rear face of the adjusting ring 30 is provided with a plurality of equally spaced bosses 74 projecting axially rearwardly therefrom and defining therebetween a plurality of slots 76 substantially equal in width. The locking means comprises a lock strap 78 which is adapted to cooperate with a slot 79 provided in the backface of the outer flanged portion 34 of the cover member 14. Fastening means is provided for releasably securing the locking means to the cover member and includes a bolt 80. As seen best in FIG. 4, the bolt 80 passes freely through an opening 90 provided in the outer end of the lock strap 78 into engagement with a threaded opening 92 provided in the back face of the cover member 14. A conventional lock washer 94 is provided to aid in preventing the bolt 80 from working its way out of opening 92. The inner end 86 of lock strap 78 extends radially inward through an opening 82 in the intermediate cover portion 38 so that the inner portion is engageable with the slot 76 between a pair of adjacent bosses 74 on the adjusting ring 30. The inner portion of the lock strap 78 disposed in the slot 76 is constructed with a circumferential width greater than the width of the slots 76 and also has a centrally positioned elongated slot 84 extending radially outwardly from its inner end 86 so as to give a resilient characteristic to the inner end of the lock strap which allows the portion of the lock strap 78 between adjacent bosses 74 to be resiliently circumferentially compressible. From this it will be apparent that this inner portion of the lock strap 78 is formed with a circumferential width greater than the width of the slots 76 and accordingly is pressed into one of the slots 76 in a preloaded condition. In the preferred embodiment, the sides of the lock strap 78 within the slot 76 extend arcuately outwardly from the balance of the lock strap while the remaining portion of the lock strap is substantially narrower. By this arrangement, the adjusting ring 30 is resiliently secured relative to the cover member 14 by the lock strap 78 and torsional vibratory loads and other loads tending to urge rotation of the adjusting ring 30 relative to the cover member 14 are resiliently resisted by the lock strap 78. Since the lock strap 78 is resiliently preloaded, there is no tendency to "pound-out" the bosses 74 thereby damaging the same and losing adjustment.

CLUTCH ADJUSTMENT

To adjust the clutch, the bolt 80 is removed and the lock strap 78 is withdrawn from engagement with the slot 76 on the adjusting ring 30. The adjusting ring 30 is then circumferentially rotated in a well known manner relative to the cover member 14 until a desired new slot 76 is properly positioned. The inner end of the lock strap 78 is then compressed in the new slot 76 and securely fastened by bolt 80 to the cover member 14. A second opening 88 is provided in the cover member 14 diametrically opposed to the opening 82 for balance purposes.

IMPROVED MOUNTING ARRANGEMENT

The present invention has remedied the problem present in the previously mentioned patent by constructing the lock strap receiving slot 79 in the cover member 14 in such a manner as to provide a positive frictional lock which will prevent unintentional rotation of the lock strap and the bolt 89 after the bolt has been securely fastened in place following a ring adjusting operation.

The improved mounting arrangement is accomplished by tapering the side walls of the slot 79 so that when engaged by the lock strap 78 the walls react to provide an interference fit which effectively keeps the bolt tight thereby preventing any possible circumferential movement of the adjusting ring relative to the cover member 14.

Figure 4:
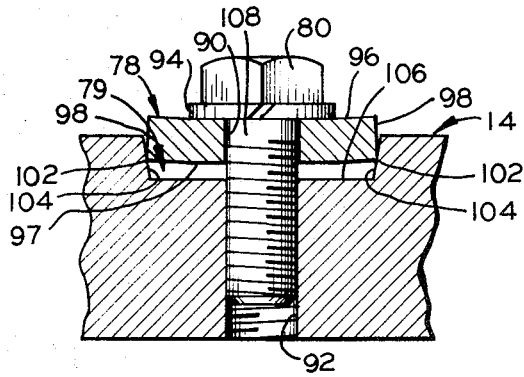
FIG. 4 is an enlarged sectional view taken along lines 4—4 of FIG. 3.
Figure 5:
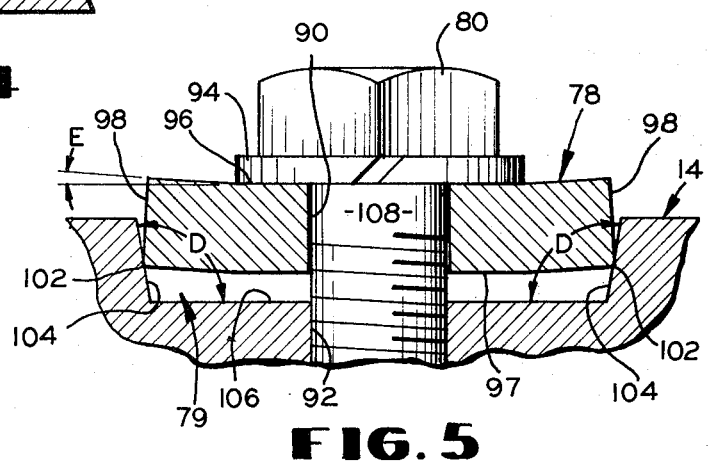
FIG. 5 is a further enlarged partial view of the structure shown in FIG. 4.

Referring now to FIGS. 3–5, the details of the improved mounting arrangement for the lock strap 78 will now be described. As best seen in FIG. 4, the lock strap 78, in the area of the slot 79, is rectangular in cross section having flat planar top and bottom wall portions 96 and 97 interconnected by a pair of spaced straight sided wall portions 98—98. By tapering the side walls of the slot 79, a positive retention means is provided for cooperating with the edges 102—102 formed by the merging of the side wall portion 97. The positive retention means is accomplished by providing a pair of outwardly beveled side walls 104 extending from the inner base portion 106 of the slot 79 for engagement which the edges 102—102 of the lock strap 78. As seen in FIG. 3, the relationship of the lock strap 78 to the slot 79 is such that the width (A) of the base 106 of the slot 79 is less than the width B of the lock strap 78 while the width B of the lock strap 78 is less than the width C formed at the outer open portion of the slot 79. Thus, as seen in FIG. 4, the dimensioning is such that the beveled walls 104—104 provide angled surfaces sufficient to allow the edges 102—102 of the strap 78 to engage and thereby maintain the bottom wall portion 97 of the lock strap to be spaced a suitable distance away from the base 106 of the slot 79. This relationship is maintained so that upon tightening of the bolt 80 the bottom wall 97 at the center section of the strap will be drawn down toward the base 106 of the slot 79 while the spaced outer sections of the strap will tend to bow outwardly with the edges 102—102 having a tendency to dig into the beveled side walls 104—104 (shown exaggerated in FIG. 5) and become pinched between the side walls by the bowing spring effect applied to the strap by the application of torque to the bolt 80. As a result of this phenomenon, an exceptionally tight interference fit is provided with the lock strap being in a position to react on the upper neck 108 of the bolt 80 in such a manner as to prevent the bolt from ever assuming a position wherein it could work its way out of engagement with the threaded opening 92 in outer portion 34 of the cover member 14. In addition, this arrangement also keeps the lock strap from rotating which also has a tendency to cause the bolt to back out.

While shown somewhat exaggerated in the drawings, in practice, the taper on the side walls has functioned satisfactorily in the range of 3.5–5° but it should be noted that the invention is not intended to be limited to this degree of taper.

It will be evident from the foregoing description that the width of the lock strap and also the slot are not critical factors due to the taper design. Thus, close tolerances do not have to be maintained since any minor dimensional differences will still enable the edges of the lock strap to engage and assume a position along the tapered side walls commensurate with the width of the strap used and still give the desired effect.

As shown in FIG. 5 the outwardly beveled side walls 104—104 form a pair of spaced opposed inner obtuse angles D and with respect to the inner base portion 106 of the slot 79. The deflection which occurs at the outer sides of the strap 78 as a result of tightening of the bolt 80 is shown at E.

The construction is such that adequate spacing is always provided between the bottom side 97 of the lock strap 78 and the adjacent inner base portion 106 of the slot 79 to enable the resilient bowing action effect or the outer edges of the lock strap to take place. Also, it can be seen that the radial length of the slot side walls 104—104 is such as to provide a line contact of sufficient length between the edges 102—102 of the strap and the side walls 104—104 to keep the strap from being capable of pivoting movement about the bolt body 108.

While only a single embodiment of this invention has been shown and described it is apparent that many changes can be made in the structure and operation thereof without departing from the scope of this invention as defined by the appended claims.

I claim:

1. A clutch including (a) a cover member, (b) an adjusting ring threadedly carried by the cover member and adapted to be rotatable relative thereto to effect adjustment of the clutch, (c) locking means having a portion secured to the cover member and a portion engageable with adjusting ring for resisting relative rotation between the cover member and the adjusting ring, (d) fastening means for releaseably securing the locking means to the cover member, (e) a slot in the cover member for receiving the portion of the locking means secured to the cover member, the improvement comprising (f) beveled side walls on the slot for engagement with the locking means to prevent release of the fastening means and locking means from the cover member.

2. A clutch according to claim 1 wherein the locking means has edges for engagement along the beveled side walls.

3. A clutch according to claim 2 wherein the slot has an inner base portion and an outer open portion and the beveled side walls interconnecting said portions.

4. A clutch according to claim 3 wherein the locking means has a width less than the outer open portion and greater than the inner base portion.

5. A clutch according to claim 3 wherein the beveled side walls form a pair of spaced obtuse angles with respect to the inner base portion.

6. A clutch according to claim 4 wherein the locking means engages the side walls of the slot and is spaced out of contact with the inner base portion.

7. A clutch according to claim 1 wherein the locking means is a radially extending lock strap removably secured to the cover member and the fastening means is a threaded bolt.

8. A clutch according to claim 7 wherein a plurality of abutment means project axially from the adjusting ring defining spaces therebetween and the lock strap is secured to the cover member and extends radially therefrom into the spaces for resisting relative threaded rotation between the cover member and the adjusting ring.

* * * * *